(12) United States Patent
Oates et al.

(10) Patent No.: US 6,835,244 B2
(45) Date of Patent: Dec. 28, 2004

(54) USE OF ORGANIC CARBON-CONTAINING MINERALS

(75) Inventors: David Bridson Oates, Kettleby (CA); John Graham Whellock, Castle Rock, CO (US); Philip Souza Zacarias, Mississauga (CA)

(73) Assignee: Lafarge Canada Inc., Quebec (CA)

( * ) Notice: Subject to any disclaimer, the term of this patent is extended or adjusted under 35 U.S.C. 154(b) by 194 days.

(21) Appl. No.: 10/228,642

(22) Filed: Aug. 26, 2002

(65) Prior Publication Data

US 2004/0035330 A1 Feb. 26, 2004

(51) Int. Cl.[7] .................................................. C04B 7/14
(52) U.S. Cl. ....................... 106/789; 106/790; 106/791; 264/5
(58) Field of Search ..................... 264/5, 333; 106/789, 106/790, 791, 707, 717, 738, 753, 764, 767, 795, 814, 817

(56) References Cited

U.S. PATENT DOCUMENTS 3,957,528 A * 5/1976 Ott et al. ..................... 106/405
5,498,277 A    3/1996 Floyd et al.
6,066,771 A    5/2000 Floyd et al.
6,416,691 B1 * 7/2002 Pildysh ........................ 264/7

FOREIGN PATENT DOCUMENTS

JP         11169815       *  6/1999

* cited by examiner

Primary Examiner—Paul Marcantoni
(74) Attorney, Agent, or Firm—Bachman & LaPointe, P.C.

(57) ABSTRACT

A synthetic slag is produced by melting the mineral content of an organic carbon-containing mineral, for example, oil shale or tar sands, with a source of lime such as cement kiln dust. The organic carbon, especially hydrocarbon, content of the mineral is oxidized by oxygen gas, which typically is derived from air or an air/oxygen combination, in an exothermic reaction and the heat generated provides the thermal energy for the reaction between the mineral content and the source of lime. In this way the gaseous products will typically comprise nitrogen, unreacted oxygen, water vapor and carbon dioxide, and heat energy can be readily recovered from the hot off gas products evolving during the combustion reaction. The synthetic slag may be pelletized and employed as lightweight mineral aggregate or milled, or atomized and then milled, to cement fineness to provide slag cement.

27 Claims, 2 Drawing Sheets

USE OF ORGANIC CARBON-CONTAINING MINERALS

BACKGROUND OF THE INVENTION i) Field of the Invention

This invention relates to a method of producing a value product from a source of lime, which may be an industrial inorganic byproduct such as cement kiln dust and minerals having an organic carbon content.

The method exploits heat generated from combustion of the organic carbon, for example, hydrocarbon, content of the mineral and hot combustion gases evolved also provide a source of heat energy which can be recovered.

ii) Description of Prior Art

Oil shale is the name applied (Dietrich and Skinner, Rocks and Rock Minerals, Wiley and Sons) to shales that can contain relatively large percentages of solid organic material that will yield both gaseous and liquid petroleum when the rocks are destructively distilled. Oil shale is a potential source of large quantities of petroleum products, with reported yields as high as 240 gallons/ton of shale for the richest oil shales. More modest deposits have heat values typically of 1000–2000 Btu/pound. Principal typical oxides are silica (50–60% $SiO_2$) and alumina (10–20% $Al_2O_3$).

More especially, oil shale is a marlstone-type sedimentary inorganic material that contains complex organic polymers, kerogen, that are high molecular weight solids. The organic kerogen component is a three-dimensional polymer.

Pyrolysis of kerogen forms bitumen, gas and coke and bitumen further pyrolyses to oil, gas and coke and ultimately to carbon. Combustion of oil shale, with excess air or oxygen combusts the hydrocarbons to carbon dioxide and water vapor.

Oil shale is recognized as a potential source of crude shale oil which can be employed as refinery feedstock.

The inorganic marlstone-type component of oil shale typically comprises sandstone, limestone and limonite. Tar sand is the name given to sandstone in which there are relatively large quantities of intergranular, highly viscous, asphalt like hydrocarbon compounds.

More especially, tar sands, also known as oil sands or bituminous rock or sands or asphalt rock, comprise sand deposits impregnated with dense, viscous petroleum. The largest deposits are in the Athabasca area of Alberta, Canada, and in the Orinoco region of Venezuela.

Recovery of petroleum from tar sands is much more costly than well extraction and refining of liquid crude.

Both oil shale and tar sands have potential as a significant source of petroleum where economic processes are valid. Traditionally these processes have required crude oil prices in the region of US $30 to 40 per barrel to justify significant production from these sources. This is because a high proportion of solids have to be handled and heated to recover a barrel of oil.

Cement kiln dust is a byproduct of cement processing and is produced in fine particulate form and is composed of partly and fully calcined calcium carbonate, thus it comprises calcium carbonate and calcium oxide (lime).

Cement plants may produce cement kiln dust (CKD) in differing quantities, even as high as 200,000 tons of cement kiln dust annually, and the CKD represents a disposal problem.

Cement kiln dust has been employed in cement production, but its fineness represents a handling problem and its use is limited by chemistry.

Blast furnace slag is a significant supplementary cement material, however, manufacture of such cement material is limited to slag supplied by iron blast furnaces having slag quenching facilities.

SUMMARY OF THE INVENTION

It is an object of this invention to produce a synthetic slag comparable to blast furnace slag and which can be employed as a supplementary cement material, or lightweight aggregate.

It is a further object of this invention to produce such a synthetic slag employing a source of lime, which may be, for example, cement kiln dust; and organic carbon, particularly hydrocarbon, containing minerals such as oil shale and tar sands.

It is still a further object of this invention to provide a method for producing such a synthetic slag, which exploits heat of combustion of the organic carbon, particularly hydrocarbon, content of minerals.

It is yet a further object of this invention to provide such a method with removal of hot combustion gases and recovery of the heat energy of such gases.

It is a still further object of this invention to produce a synthetic slag as described hereinbefore, from the mineral component of oil shales or tar sands, while exploiting the organic component of the oil shales or tar sands, as a source of heat to drive the synthesis reaction.

In accordance with the invention there is provided a method of producing a value product from a source of lime and organic carbon containing mineral comprising: a) establishing an initial melt of an inorganic material providing a source of lime and an organic carbon-containing mineral providing a source of silica, in the presence of a source of alumina; b) adding fresh amounts of said inorganic material, said source of alumina and said organic carbon-containing mineral to said initial melt, c) oxidising the organic carbon content of said mineral in said melt with generation of heat, and exploiting the generated heat in the melting of said fresh amounts to produce an enlarged melt of molten calcium aluminosilicate material, and d) recovering a value product from said enlarged melt.

DESCRIPTION OF PREFERRED EMBODIMENTS

Figure 1:
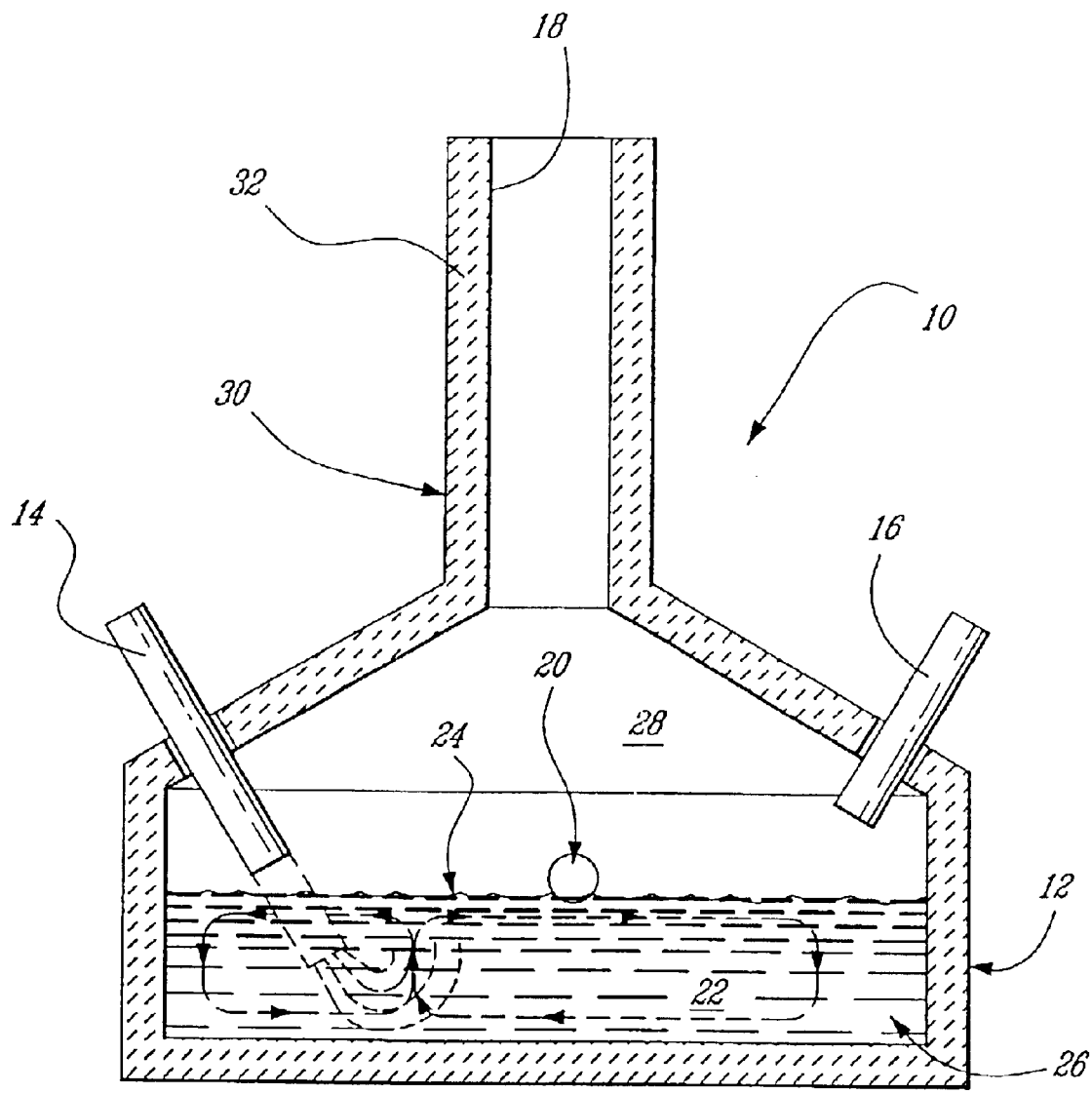
FIG. 1 illustrates schematically a combustion furnace for carrying out the method of the invention, in one embodiment.

The method of the invention produces a value product from a source of lime and organic carbon-containing minerals, including natural deposits, the organic carbon content of which is difficult or often uneconomic to recover.

In particular, the method employs a natural organic carbon-containing mineral, for example, tar sands or oil shale; or organic solvent contaminated oils which represents a significant disposal problem; and a source of lime. The source of lime is in particular cement kiln dust which is a byproduct of cement production, however, other sources of lime may be employed including limestone, calcined lime, dolomite, calcite or other forms of calcium carbonate and lime (quick lime) itself or calcium hydroxide (slaked lime) or combinations thereof.

In the case of tar sands or oil shale the organic carbon content is, more especially, in the form of hydrocarbons.

The melt may be supplemented and extended by auxiliary materials which introduce the elements Ca, Si and Al into the melt, for example, calcium silicate, calcium aluminate and calcium aluminosilicate, air cooled blast furnace slags "high" and "low" lime coal ashes, and materials such as steel slags which introduce other elements such as Mg; further examples of auxiliary materials to introduce Mg are magnesium oxide, hydroxide or carbonate.

Coal ashes from bituminous coals are classed as "low" lime with CaO reported typically below 8% by CSA, for example a Class F fly ash. Coal ashes from lignite and sub-bituminous coals have higher reported CaO, for example Class C fly ashes, of which intermediate Class C fly ashes typically have 8 to 20%, by weight CaO and high Class C fly ashes have greater than 20%, for example 20 to 30%, by weight of CaO, by CSA.

i) Organic Carbon-Containing Mineral

The mineral may be a natural deposit, for example, tar sands or oil shale, the organic component of which is generally difficult or uneconomic to recover; or it may be an artificial waste such as organic solvent contaminated soils. For example oil shale may have a gross calorific value of between 1000 and 2000 Btu/pound derived from the contained organic content, in the form of hydrocarbons and this is especially advantageously employed in the present invention.

The mineral component of these materials comprises inorganic compounds of Si, Al and Ca as well as of other elements such as Fe. Shale is principally silica at 50–60% $SiO_2$ and alumina at 10–20% as $Al_2O_3$, usually with some alkaline earth oxides such as MgO or CaO.

Tar sands comprise a siliceous or sand component as the mineral component, and typically would require the supplementary addition of alumina, for example, from bauxite, refractory brick or coal ash.

Oil shales comprise sandstone, limestone and limonite. Thus oil shales provide the required silica and the required alumina, without the need for a separate source of alumina.

Contaminated soils comprise natural silicates and aluminate minerals, loaded with waste organic solvent which organic solvent may have a significant but difficult to exploit fuel source.

While attention has been directed to oil shales and tar sands as a source of petroleum, the inorganic mineral component of oil shales and tar sands has not generally attracted attention and would be regarded as a low value byproduct. Oil shale has been suggested as a component in the raw material of cement manufacturing to contribute its chemical components and to provide some supplementary heat. However, cement manufacture does not involve the formation of a fluid slag.

The present invention particularly exploits the mineral component in the manufacture of a molten synthetic slag while exploiting the organic component as fuel to drive the reaction of the mineral component with a source of lime. The molten synthetic slag is subsequently air-cooled, granulated or pelletized or atomized to form a product suitable as a cement supplement. It will be appreciated that the formation of a molten product requires a significant additional energy contribution. This is made available expeditiously by the organic fraction of the soil, oil shale or tar sand, whose mineral content also provides the active ingredients for the ultimate production of a cementitious synthetic slag.

ii) Cement Kiln Dust

Cement kiln dust is produced in a cement kiln as a byproduct in the manufacture of cement.

Cement kiln dust is composed of fine particles typically having a particle size of 100% passing 300 microns and 50% passing 20 microns.

Table 1 below, sets out a typical chemical composition of cement kiln dust.

TABLE 1

| | Chemistry % | | | | | | | | | |
|---|---|---|---|---|---|---|---|---|---|---|
| Material | $SiO_2$ | $Al_2O_3$ | $Fe_2O_3$ | CaO | $SO_3$ | MgO | $Na_2O$ | $K_2O$ | $TiO_2$ | LOI |
| CKD | 0–25 | 0–10 | 0–5 | 20–60 | 0–20 | 0–5 | 0–2 | 0–10 | 0–1 | 5–30 |

LOI = Loss of Ignition iii) Melting Method

The method will be more particularly described by reference to the preferred embodiment in which the source of lime is cement kiln dust and the organic carbon-containing mineral is oil shale.

The method involves the high temperature oxidation reaction of the cement kiln dust and oil shale to generate a molten calcium aluminosilicate material which may be considered a synthetic slag, since it has a chemistry which mimics that of slag from an iron blast furnace.

The reaction takes place with oxygen which may be employed as oxygen gas, air or oxygen-enriched air. Other gas mixtures which include free oxygen may also be employed provided they do not interfere with the desired reaction or are inert to such reactions.

The oxygen oxidizes the organic carbon content of the oil shale to oxides of carbon in an exothermic reaction and the heat generated in the exothermic reaction is exploited in the formation of the desired chemical composition of the synthetic slag produced in a molten form; the heat from the off gases can be used for electricity production or other purposes.

The oxidation of the organic carbon ultimately forms carbon dioxide and possibly carbon monoxide but the latter is further oxidized to carbon dioxide; oxygen is typically supplied in an excess of that required for combustion of the carbon and thereby ensures oxidation of any carbon monoxide to dioxide.

The method may be carried out on a continuous basis or on a semi-continuous or continual or batchwise basis.

The relative amounts of the oil shale and the source of lime considered on the basis of $SiO_2$ and $Al_2O_3$ relative to CaO, as percentages, will typically be 1 to 2.5:1 to provide a synthetic slag of calcium aluminosilicate in accordance with the invention. Where the final chemistry may be deficient in one or other oxides, supplementary materials containing calcium, silica or alumina may be used to adjust the deficiency.

Typical Oxide Ranges Are

| SiO$_2$ | Al$_2$O$_3$ | TiO$_2$ | P$_2$O$_5$ | Fe$_2$O$_3$ | CaO | MgO | Mn$_2$O$_3$ | Na$_2$O |
|---|---|---|---|---|---|---|---|---|
| 25 | 10 | 0 | 0 | 0 | 15 | 0 | 0 | 0 |
| 55 | 30 | 2 | 1.0 | 15 | 60 | 20 | 2 | 10 |

At the start-up supplementary heat may be required for the melting to establish an initial melt of a charge of cement kiln dust and oil shale, thereafter the heat for reaction and melting of fresh charges of cement kiln dust and oil shale added to the melt may be generated in situ by the oxidation of the organic carbon content of the oil shale.

It is within the scope of the invention for the aforementioned generated heat to provide the primary heat for the melting process, and for supplementary or secondary heat to be provided by addition of carbonaceous material to the melt.

Whether or not supplementary heat is necessary will depend on the level of organic carbon content in the oil shale, and the relative amounts of cement kiln dust and oil shale employed in a particular operation. The latter may depend, in part, on the relative abundance of the cement kiln dust and the oil shale at the site where the method is carried out.

The need for supplementary heat is also a junction of the ultimate melting point of the slag system, the higher the operating temperature employed to maintain good fluidity of the synthetic slag, the more likely the need for additional fuel separate from the fuel value in the oil shale. To some extent more oxygen enrichment of the oxidizing gas (air and oxygen) will enable this temperature to be met without additional fuel.

It will be understood that the oil shale may be supplemented with materials of similar chemistry such as coal ash, an air cooled blast furnace slag and steel slag. Steel slags are generally not used as supplementary cements because of the presence in them of unreacted magnesium oxide and are largely waste products. Such steel slags can be used as a component of the melt in the process of the invention. The magnesium would react with other elements in the melt, would be diluted and/or become a stable component of the quenched output.

The method may be carried out in any furnace or high temperature reactor capable of maintaining a fluid melt of the cement kiln dust and oil shale and into which oxygen gas can be readily introduced for the oxidation of the organic carbon.

An important part of the process of the invention is the principal use of inexpensive fuel within the ingredients as opposed to expensive external fueling.

Suitable furnaces include submerged combustion furnaces, Noranda reactors, flame reactors and flame spray reactors all of which are known in metal recovery from metal ores, or metal melting.

In general a suitable furnace provides a molten bath of the charged material, and additional charges are introduced from above the upper bath surface. Oxygen gas, for example, oxygen enriched air, is injected into the molten bath through an elongate lance or through a plurality of lances. The oxygen gas is injected at high velocity to coot the lance, or the lance may be indirectly cooled, and the injected oxygen gas agitates the melt to disperse the oxygen therein for reaction with the organic carbon content of the oil shale. At the same time the agitation causes splashing of the melt as a coating on the lance, which coating serves to protect the lance from the high temperature of the molten bath.

The lance or lances may terminate just above the melt or be submerged entering from the top of the vessel or through the sidewalls. Instead of a lance or in addition to the lance there may be employed tuyères (nozzles or pipes) in the sidewalls such as are employed in Noranda reactors or converters used for smelting ores or concentrates. In certain cases porous plugs may be used to achieve a stirring effect or supply air and oxygen to the melt. By the agency of these lances or tuyeres the melt is agitated by the injected oxygen gas, and the reactants are mixed. An emulsion of bubbles of gas and liquid synthetic slag is created providing a high surface area for enhancement of the combustion and synthetic slag formation reactions. The hot gas bubbles of combustion products, principally nitrogen and carbon dioxide, generated in the bath by the exothermic reaction rise upwardly and escape from the bath upper surface; in their passage to the upper bath surface heat in the bubbles transfers to the molten bath. The off gases which escape from the bath upper surface into the zone above the bath are removed from the furnace. These off gases are hot, typically close to the temperature of the melt itself, and their heat energy may be recovered, for example, by conventional heat transfer techniques, for use in boiler heating or the like.

The recovery of heat energy represents a significant benefit of the method of the invention.

Any carbon monoxide escaping the bath will typically be oxidized to carbon dioxide by oxygen in the atmosphere of the zone above the bath, as there will generally be an excess of oxygen over that required stoichiometrically.

The melting process typically requires a temperature of 1200° C. to 1650° C., preferably 1300° C. to 1450° C., for the melting reaction to proceed satisfactorily and result in a fluid synthetic slag with sufficient heat to flow from the furnace or reactor with ease.

As additional or fresh charges of the cement kiln dust and oil shale are introduced to the furnace the molten bath enlarges; molten material may be discharged continuously or periodically from the bath and recovered as a value product.

iv) Value Product

The molten calcium aluminosilicate or synthetic slag may be processed in different ways depending on the value product desired.

In a particular embodiment the synthetic slag is pelletized and the resulting pellets may be employed as a mineral aggregate, in concrete or the like, or the pellets may be ground to a particulate calcium aluminosilicate cement which may be employed in the same way that blast furnace slag cement is employed, alone or blended with other cements.

Pelletizing typically involves forming droplets of the molten synthetic slag and quenching the molten droplets while allowing the droplets to expand during solidification. In this way the pellets are formed as an expanded lightweight aggregate.

The pelletizing may, in particular, be achieved by feeding the molten synthetic slag onto a pelletizing wheel and continuously spraying the wheel with high volumes of water. In this way expanded pellets are formed which are lighter in weight than naturally formed mineral aggregates.

The pellets can be used directly as lightweight aggregates or can be milled or ground to cement fineness to be employed as slag cement.

In certain cases the slag may be made into a value product by atomizing with jets of air or gas with or without mechanical means such as spinning disk mechanisms. The ability to do this may depend on the viscosity of the material and some superheating of the product melt and controlled rate of quenching may be necessary to achieve the desired product.

Alternatively the synthetic slag may be simply quenched in water and then granulated in a granulator to provide slag cement.

Both lightweight aggregate and slag cement represent value products, which can be produced, in accordance with the invention for inorganic byproducts of industrial processes, which byproducts are produced in high volume and present a disposed and handling problem.

The heat produced from the off gases is significant as a source of heat for steam production for electricity or other purposes.

DESCRIPTION OF PREFERRED EMBODIMENT WITH REFERENCE TO DRAWING

With further reference to FIG. 1, a combustion furnace 10 has a furnace housing 12, a lance 14, an inlet 16, which may also be a lance, an exhaust gas outlet 18 and a tapping outlet 20.

A molten bath 22 having an upper bath surface 24 is formed in a lower region 26 of furnace 10. A zone 28 is defined above surface 24.

Furnace housing 12 has a furnace wall 30 and a refractory lining 32. Typically furnace wall 30 is externally cooled by means (not shown).

The method employing furnace 10 is further described by reference to the preferred embodiment employing cement kiln dust and oil shale. An initial charge of cement kiln dust and oil shale is introduced through inlet 16 into lower region 26 of furnace 10.

Oxygen gas or air and fuel are introduced to the lower region 26 through lance 14 to produce an initial melt of the charge as molten bath 22. The oil shale containing organic carbon, more especially hydrocarbons, to be burned together with oxygen gas, for example, air, are jetted through lance 14 or dropped in through inlet 16 into bath 22; if the oilshale is not fine enough to be jetted through lance 14 it is dropped through inlet 16. This jetting may be above or below the melt, however, there should be sufficient jetting velocity to entrain gas bubbles in the bath 22 and stir the bath 22 as shown by the arrows. Thereafter fresh charges of the oil shale and cement kiln dust are introduced through inlet 16 or lance 14 and thereafter the oxygen gas and preferably the oil shale, with or without cement kiln dust are injected into the molten bath 22 through lance 14 (shown operating just above or below surface 24) to enlarge the melt in molten bath 22.

The heat for melting the fresh charges is derived from the exothermic oxidation of the organic carbon, more especially hydrocarbons, in the oil shale by the oxygen in the oxygen gas or air.

The oxidation of the organic carbon produces hot bubbles of carbon dioxide gas which rise through the molten bath 22 and escape from surface 24 into zone 28. Similarly, the hydrogen component of the hydrocarbon in the oil shale reacts with evolution of heat to produce water vapor.

Heat is transferred from the hot bubbles to the molten bath as the bubbles rise.

The hot off gas in zone 28 is removed from furnace 10 through outlet 18. Any carbon monoxide escaping bath 22 is oxidized by oxygen in zone 28. The hot offgas exhausted through outlet 18 is subject to heat recovery operations, for example, in gas to air heat exchangers or waste heat boilers or, in certain circumstances, for preheating solids entering the furnace. This would include such material being fed as limestone, dolomite or lime bearing products or other feed that is not being physically injected which might effectively be preheated, whereafter the offgas can be discharged to atmosphere.

Carbon dioxide is derived from oxidation of the organic carbon content of the oil shale and also from thermal decomposition of calcium carbonate in the cement kiln dust.

The charges of oil shale and cement kiln dust are in proportions so that the melt produces a synthetic slag of calcium aluminosilicate.

The synthetic slag is discharged from outlet 20 and typically is subjected to pelletizing to produce pellets, which may be employed as mineral aggregate or milled or ground to slag cement fineness.

Alternatively, the synthetic slag may be atomized by gas or air jets using mechanical means too, as necessary, to form a fine product which may require only minimal milling if at all. Hot and cold atomizing may be selected depending on the physical sizes and shapes required of the quenched slag particles and fibres.

Oxygen gas or air is injected to provide stoichiometric excess for oxidation of the organic carbon, especially hydrocarbons, content of the oil shale, to ensure that all of the organic carbon and hydrogen are oxidized.

Figure 2:
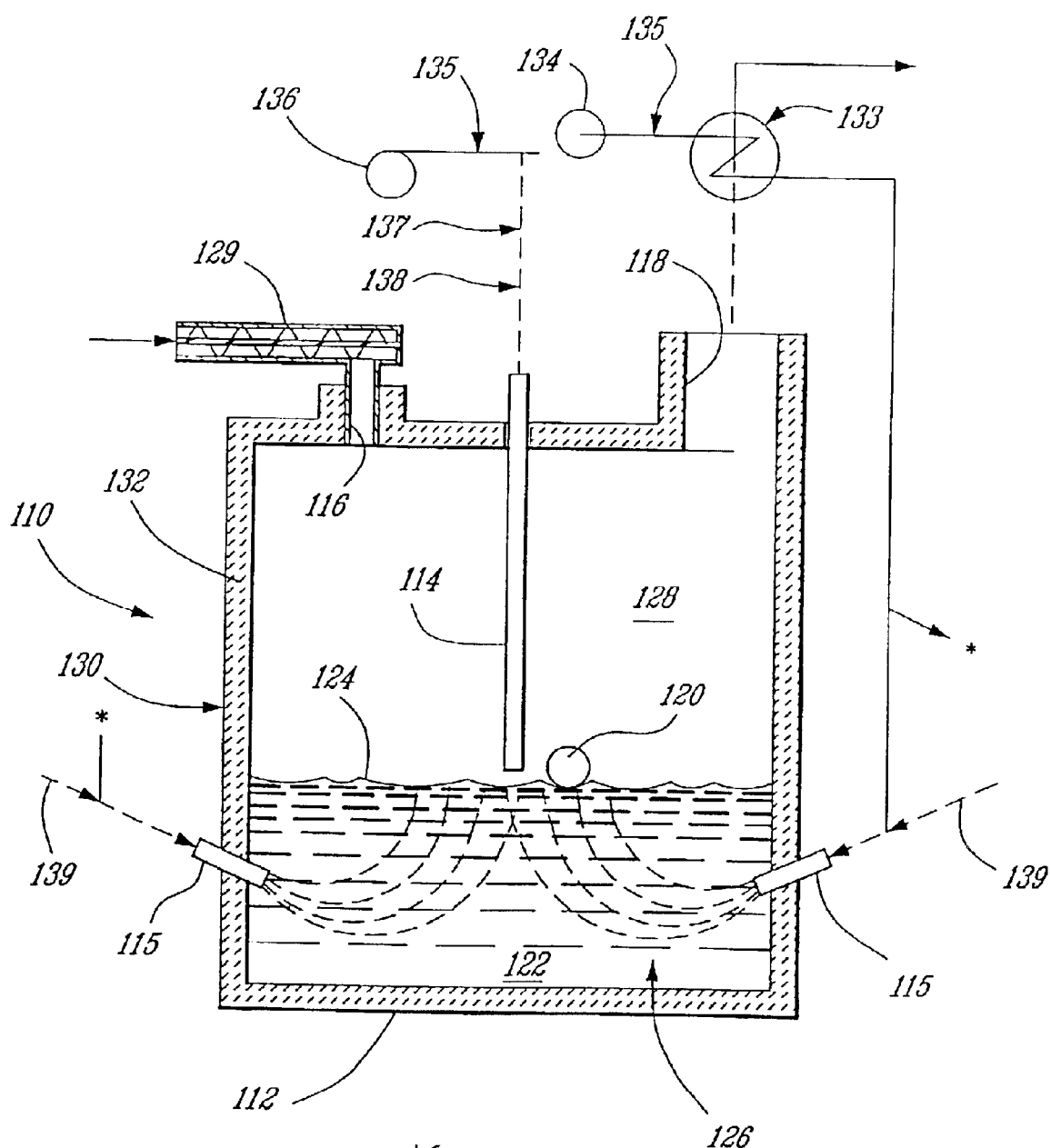
FIG. 2 illustrates schematically a furnace for carrying out the invention in a different embodiment.

FIG. 2 shows an alternative embodiment of reactor which has some of the features of FIG. 1. The furnace 110 has a housing 112, an inlet 116, an exhaust gas outlet 118 and a tapping outlet 120.

Furnace 110 has a lance 114 and tuyeres or pipes 115.

A molten bath 122 having an upper bath surface 124 is formed in a lower region 126 of furnace 110. A zone 128 is defined above surface 124.

Furnace housing 112 has a furnace wall 130 and a refractory lining 132.

Typically furnace wall 130 is externally cooled by means (not shown).

The method employing furnace 110 is further described by reference to the preferred embodiment employing cement kiln dust and oil shale.

An initial charge of cement kiln dust and oil shale is introduced through inlet 116 via a feeder 129, for example a screw conveyor, into lower region 126 of furnace 110. The lance 114 which could be one or a plurality of lances, depending on the desired configuration and ultimate size of the unit, has a blower 136 providing a source of air. CKD at 137 and oil shale at 138 are introduced into the lance 114 and jetted into the bath 122. The air may be oxygen enriched at point 135. Submerged tuyeres or pipes 115 inject air and/or oxygen beneath the surface 124. The tuyeres 115 may supplement the lance 114 or be employed in place of the lance 114. The option exists to pass the air from a blower 134 through a heat exchanger 133 to preheat the air or air oxygen mixture (oxygen if added entering at 135) before it enters the melt while simultaneously cooling the exhaust gases leaving the furnace.

A portion of the total oxygen required for the combustion and reaction process may come from the submerged tuyères 115 and a proportion from the lance 114. It is also possible to design the entire operation without the lance 114 to jet into the melt, except that this is a useful feature to enable initial melting by injection of for example a gaseous fuel with air or oxygen enriched air. If the lance 114 is dispensed with for feeding then it is appropriate to inject the oil shale, through point 139, into the melt through the tuyères 115, but if there is insufficient organic carbon, for example, hydrocarbons to meet the heat balance then coarser coal or other solid fuel may be fed into the vessel through the feeder 129 and inlet 116. The heat for melting the fresh charge is derived from the exothermic oxidation of the organic carbon, for example, hydrocarbon, content of the oil shale by the oxygen in the oxygen gas or air.

The charges of oil shale and cement kiln dust are in proportions so that the melt produces a synthetic slag of calcium aluminosilicate.

The synthetic slag is discharged from outlet 120 and typically is subjected to pelletizing to produce pellets which may be employed as mineral aggregate or milled or ground to slag cement fineness.

Oxygen gas or air is injected to provide an excess for combustion of the organic content of the oil shale, to ensure that all of the carbon and hydrogen content are oxidized.

In some circumstances premixing of the oil shale and cement kiln dust would be desirable in appropriate proportions for injection through lance 114 or through tuyères 115.

It is also practical in certain instances for the total reactants to be fed through the feeder 129 and inlet 116 provided there is sufficient distribution of oxygen through the tuyères 115 or through a lance 114 to enable combustion and distribution of the heat so generated around the melt.

Suffice it to say there are a number of options in the way the process might be implemented and the appropriate furnace designed. The examples given here are for descriptive purposes only. For those skilled in the art other possibilities will be evident using none, one or a number of nozzles, tuyères or even porous plugs for injection of the oxygen gas. If one or more lances are used and whether these operate by entraining and injecting from above the melt or are submerged and the level of preheat or oxygen enrichment will be an economic choice for the furnace designer. The principles that should be observed are: sufficient excess oxygen for completion of the combustion reaction; appropriate ratio of the reactants to form the desired synthetic slag chemistry; and sufficient heating value in the organic carbon or hydrocarbon-containing mineral with or without the addition of supplementary fuel, coal or waste fuels to meet a heat balance at a high enough temperature. This temperature is predetermined to exceed the fusion point of the slag product and suitably with a sufficient excess temperature to permit a low viscosity of the slag for ease of mixing and discharge from the vessel.

Suitably the excess oxygen gas is more than 0% up to 50% with a preference for 5% to 15% on a stoichiometric basis.

In certain circumstances, for example, when it is desired to produce an atomized product, the melt may be superheated as it exits the furnace to lower its viscosity. This may permit appropriate fluidity for controlled particle size of the atomized product. The atomization itself may take the form of a set of air or gas jets operating at pressure and other thermal or mechanical means, if necessary, to control the quenching so that it produces an appropriately fine size range and shape of the product material.

In particular, the atomizing may comprise rapid cooling by high pressure air or gas jets, with or without superheating the melt, to produce an atomized product of fine particles thereby substantially reducing or eliminating the need for milling for its subsequent use in synthetic slag cement.

Such atomizing may be at a cold or hot temperature which can determine the size and shape of the particles or fibres produced.

In the case where the atomizing is hot gas atomizing, heat energy of the hot gas may be recovered to supplement the heat recovered in other parts of the process.

What is claimed is:

1. A method of producing a synthetic slag from a source of lime and organic carbon-containing mineral comprising:
    a) establishing an initial melt of an inorganic material providing a source of lime and an organic carbon-containing mineral providing a source of silica, in the presence of a source of alumina,
    b) adding fresh amounts of said inorganic material, said source of alumina and said organic carbon-co taming mineral to said initial melt,
    c) oxidising the organic carbon content of said organic carbon-containing mineral in said melt with generation of heat, and exploiting the generated heat in the melting of said fresh amounts to produce an enlarged melt of molten calcium aluminosilicate material, and
    d) recovering a synthetic slag of calcium aluminosilicate material from said enlarged melt.

2. A method according to claim 1, wherein said inorganic material providing a source of lime is cement kiln dust.

3. A method according to claim 1, wherein said inorganic material providing a source of lime is selected from the group consisting of limestone, dolomite, calcined lime, calcite, calcium carbonate, quicklime calcium hydroxide and combinations thereof.

4. A method according to claim 1 wherein said organic carbon content is comprised of hydrocarbons.

5. A method according to claim 2, wherein said mineral is oil shale.

6. A method according to claim 2, wherein said mineral is tar sand.

7. A method according to claim 2, wherein said mineral is solvent contaminated soil.

8. A method according to claim 1, wherein the heat generated by oxidising the organic carbon content of said mineral in c) is the primary heat in said melting of said fresh amounts to produce said enlarged melt.

9. A method according to claim 8, wherein said initial melt is established in step a) with supplementary heat and thereafter supply of said supplementary eat is discontinued.

10. A method according to claim 8, further including adding waste carbonaceous material to said melt and oxidising said waste carbonaceous material to generate heat to supplement said primary heat in said melting.

11. A method according to claim 1, wherein step d) comprises pelletising said enlarged melt.

12. A method according to claim 11, wherein said pelletising comprises forming droplets of said enlarged melt and quenching said droplets while allowing the quenched droplets to expand and solidify.

13. A method according to claim 11, including grinding the thus produced pellets to a cement fineness.

14. A method according to claim 1, wherein said mineral is oil shale.

15. A method according to claim 1, including a step of adding steel slag to said melt.

16. A method according to claim 6, further comprising adding a source of alumina to said melt.

17. A method of producing a synthetic slag cement comprising:
    a) establishing an initial melt of cement kiln dust and oil shale;
    b) adding fresh amounts of said cement kiln dust and oil shale to said melt;

c) oxidising the hydrocarbon content of oil shale in said melt with generation of heat, and exploiting the generated heat in the melting of said fresh amounts to produce an enlarged melt of molten calcium aluminosilicate material, and d) recovering a synthetic slag cement from said enlarged melt.

18. A method according to claim 17, including a step of:

e) removing hot combustion gases from said enlarge melt and recovering heat energy from said hot combustion gases for other heat transfer uses, power production or reheating solids.

19. A method according to claim 17, wherein the heat generated by oxidising the hydrocarbon content of said oil shale in c) is the primary heat in said melting of said fresh amounts to produce said enlarged melt.

20. A method according to claim 19, wherein said initial melt is established in step a) with supplementary applied heat and thereafter supply of said supplementary heat is discontinued.

21. A method according to claim 20, including adding waste carbonaceous material to said melt and oxidising said waste carbonaceous material to generate heat to supplement said primary heat in said melting.

22. A method according to claim 17, wherein step d) comprises forming droplets of said enlarged melt, quenching said droplets while allowing the quenched droplets to expand and solidifying and grinding the solidified, expanded droplets to a cement fineness.

23. A method according to claim 17, wherein said oil shale has a gross calorific value of between 1000 and 2000 Btu/pound, derived from the hydrocarbon content.

24. A method according to claim 17, wherein step d) comprises rapid cooling by high pressure air or gas jets with or without superheating the melt to produce an atomized product of fine particles and thereby substantially educe or eliminate the need for milling for its subsequent use in synthetic slag cement.

25. A method according to claim 24 wherein said atomizing is at a cold or hot temperature which can determine the size and shape of the particles or fibres produce.

26. A method according to claim 25 wherein said atomizing is hot gas atomizing and heat energy is recovered.

27. A method according to claim 1, wherein said mineral is tar sand.

* * * * *